United States Patent
Shiraishi et al.

(10) Patent No.: US 8,820,102 B2
(45) Date of Patent: Sep. 2, 2014

(54) VENTILATION AND AIR CONDITIONING APPARATUS FOR VEHICLE

(75) Inventors: Kazuhiko Shiraishi, Tokyo (JP); Hirokazu Taniguchi, Tokyo (JP); Yoshihiro Sumida, Tokyo (JP); Akihiro Nishida, Tokyo (JP); Masato Yosomiya, Tokyo (JP); Tetsuya Yamashita, Tokyo (JP); Takashi Okazaki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 434 days.

(21) Appl. No.: 12/991,988

(22) PCT Filed: Jun. 11, 2009

(86) PCT No.: PCT/JP2009/060656
§ 371 (c)(1),
(2), (4) Date: Nov. 10, 2010

(87) PCT Pub. No.: WO2009/151092
PCT Pub. Date: Dec. 17, 2009

(65) Prior Publication Data
US 2011/0067421 A1 Mar. 24, 2011

(30) Foreign Application Priority Data
Jun. 12, 2008 (JP) .................. 2008-154348

(51) Int. Cl.
*F25D 17/00* (2006.01)
*B60H 1/00* (2006.01)
*B61D 27/00* (2006.01)

(52) U.S. Cl.
CPC ........ *B60H 1/00978* (2013.01); *B61D 27/0018* (2013.01)
USPC ............................................ 62/186; 62/285

(58) Field of Classification Search
USPC .................. 62/126, 149, 186, 285; 236/49.3
See application file for complete search history.

(56) References Cited

U.S. PATENT DOCUMENTS 5,307,645 A * 5/1994 Pannell ........................... 62/244
5,375,427 A * 12/1994 Hara et al. ...................... 62/159
(Continued)

FOREIGN PATENT DOCUMENTS

| CN | 101144649 A | 3/2008 |
| DE | 197 31 369 C1 | 7/1998 |

(Continued)

OTHER PUBLICATIONS

The Extended European Search Report dated Dec. 21, 2011, issued in the corresponding European Application No. 09762522.2-2423. (6 pages).

(Continued)

*Primary Examiner* — Allana Lewin
*Assistant Examiner* — Kun Kai Ma
(74) *Attorney, Agent, or Firm* — Buchanan Ingersoll & Rooney PC

(57) ABSTRACT

A ventilation and air conditioning apparatus for a vehicle includes: a ventilator that sucks air from outside the vehicle; an air conditioner that conditions air inside the vehicle; a duct for fresh outside air that connects the ventilator with the air conditioner so as to supply the air that the ventilator has sucked from outside the vehicle to the air conditioner; and a duct for conditioned air that supplies the conditioned air blown out from the air conditioner to inside the vehicle. The duct for fresh outside air is branched so as to be connected to the duct for conditioned air. With this configuration, even if the operation of the air conditioner is stopped due to, e.g., a leakage of a flammable refrigerant, an amount of ventilation can be secured in the vehicle.

15 Claims, 2 Drawing Sheets

(56) References Cited

U.S. PATENT DOCUMENTS

| | | | |
|---|---|---|---|
| 5,572,881 A * | 11/1996 | Hotta et al. | 62/278 |
| 5,918,475 A * | 7/1999 | Sakakibara et al. | 62/186 |
| 2003/0056529 A1* | 3/2003 | Kakehashi et al. | 62/186 |
| 2003/0196449 A1* | 10/2003 | Fujita et al. | 62/468 |
| 2003/0217561 A1* | 11/2003 | Shindo et al. | 62/264 |
| 2004/0221597 A1 | 11/2004 | Hille et al. | |
| 2005/0241805 A1 | 11/2005 | Singh et al. | |
| 2006/0070658 A1* | 4/2006 | Nakata et al. | 137/312 |
| 2006/0130663 A1* | 6/2006 | Joshi et al. | 96/224 |
| 2008/0060367 A1* | 3/2008 | Zima et al. | 62/149 |
| 2008/0061159 A1 | 3/2008 | Okano et al. | |

FOREIGN PATENT DOCUMENTS

| | | |
|---|---|---|
| EP | 1 297 978 A2 | 4/2003 |
| FR | 2906877 A1 * | 4/2008 |
| JP | 2-014915 A | 1/1990 |
| JP | 4-043118 A | 2/1992 |
| JP | 5-069824 A | 3/1993 |
| JP | 8-002410 A | 1/1996 |
| JP | 8-121807 A | 5/1996 |
| JP | 2001-302567 A | 10/2001 |
| JP | 2005-178428 A | 7/2005 |
| JP | 2006-160713 A | 6/2006 |
| JP | 2007-191137 A | 8/2007 |
| JP | 2007-315663 A | 12/2007 |
| JP | 2007-536390 A | 12/2007 |
| WO | WO 2004/065864 A1 | 8/2004 |

OTHER PUBLICATIONS

International Search Report (PCT/ISA/210) issued on Jul. 7, 2009, by Japanese Patent Office as the International Searching Authority for International Application No. PCT/JP2009/060656.

Office Action (Notification of the First Office Action) dated Jun. 20, 2012, issued in corresponding Chinese Patent Application No. 200980121574.1, and an English Translation thereof. (12 pages).

Office Action (Notice of Reasons for Rejection) dated Oct. 9, 2012, issued by the Japanese Patent Office in the corresponding Japanese Patent Application No. 2008-154348 and an English translation thereof. (4 pages).

Office Action (Notice of Final Rejection) dated Mar. 5, 2013, issued in corresponding Japanese Patent Application No. 2008-154348, and an English Translation thereof. (2 pages).

* cited by examiner

US 8,820,102 B2

VENTILATION AND AIR CONDITIONING APPARATUS FOR VEHICLE

TECHNICAL FIELD

The present invention relates to a ventilation and air conditioning apparatus for a vehicle installed in a vehicle such as a railway.

BACKGROUND ART

As a technique regarding a vehicle ventilator, which aims at "simplifying structure to reduce labor in manufacturing, securing appropriate air quantity and air speed while maintaining predetermined air conditioning performance, and reducing noise", there has been proposed a vehicle ventilator provided with: a first duct arranged in the upper part of a vehicle so as to supply conditioned air from an air conditioning means into a cabin; a second duct arranged in the lower part of the vehicle so as to suck air inside the cabin for returning; a third duct arranged in the lower part of the vehicle so as to suck air inside the cabin for leading it to an exhaust means; an air conditioning means arranged under the floor so as to mix return air from the second duct with air from outside the cabin sucked in by suction means for air conditioning; and ventilation means including the suction means and exhaust means, wherein when the inside of the cabin is partitioned, independent ventilation means are provided for respective compartments and the third duct is connected to an exhaust port of a lavatory" (Patent Document 1).

Further, as a technique regarding a vehicle air conditioner, which aims at solving a problem that "in a vehicle air conditioner using flammable refrigerant, leaking refrigerant cannot be sometimes discharged to outside by a fan device and there is fear that the refrigerant may be leaked from an internal air introduction port into a cabin even if a door of an air delivery device is closed", there has been proposed a vehicle air conditioner "having a configuration in which a concentration of the flammable refrigerant is prevented from arriving at a combustion range by increasing an external air introduction amount when the leakage amount of the flammable refrigerant is small and when the leakage amount of the flammable refrigerant is large, air conditioned air blowout ports 11, 12, 13 and an internal air introduction port 3 are closed to thereby completely isolate the inside of a casing 2 from the inside of the cabin and the operation of a compressor 19 is stopped" (Patent Document 2).

CITATION LIST

Patent Document

Patent Document 1: Japanese Unexamined Patent Application Publication No. H05-069824 (Abstract)
Patent Document 2: Japanese Unexamined Patent Application Publication No. 2005-178428 (Abstract)

SUMMARY OF INVENTION

Technical Problem

In recent years, in terms of prevention of global warming, adoption of refrigerant having a low global warming potential, such as HFO-1234 (tetrafluoropropene, global warming potential=4) has been proposed.

However, in the case where HFO-1234, which is flammable, is adopted in the duct configuration disclosed in Patent Document 1, if a refrigerant leakage occurs in an air conditioner, the refrigerant may flow out into a vehicle cabin, which may cause the refrigerant to catch fire from, e.g., a cigarette of a passenger to burn.

A configuration may be considered in which the operation of a compressor of the air conditioner is stopped at the time of occurrence of the refrigerant leakage so as to prevent the refrigerant from flowing out into the vehicle cabin as in the case of the technique disclosed in Patent Document 2.

However, the air conditioner also plays a role of supplying conditioned air into the cabin, so that if the operation of the air conditioner is stopped, ventilation in the cabin is stopped.

The present invention has been made to solve the above problem, and an object thereof is to provide a ventilation and air conditioning apparatus for a vehicle capable of securing an amount of ventilation in the vehicle even if the operation of an air conditioner is stopped due to a leakage of the flammable refrigerant.

Solution to Problem

A ventilation and air conditioning apparatus for a vehicle according to the present invention includes: a ventilator that sucks air from outside the vehicle; an air conditioner that conditions air inside the vehicle; a duct for fresh outside air that connects the ventilator with the air conditioner so as to supply the air that the ventilator has sucked from outside the vehicle to the air conditioner; and a duct for conditioned air that supplies the conditioned air blown out from the air conditioner to the inside the vehicle, in which the duct for fresh outside air is branched so as to be connected to the duct for conditioned air.

Advantageous Effects of Invention

According to the ventilation and air conditioning apparatus for a vehicle of the present invention, even if the operation of an air conditioner is stopped, fresh outside air is supplied to inside a vehicle and thereby an amount of ventilation can be secured.

DESCRIPTION OF EMBODIMENTS

First Embodiment

Figure 1:
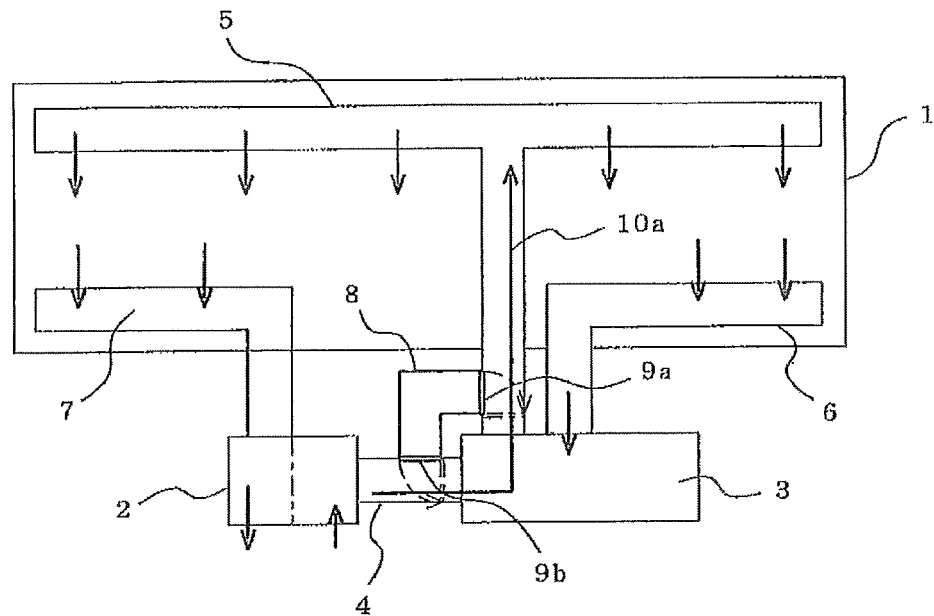
FIG. 1 is a configuration diagram of a ventilation and air conditioning apparatus for a vehicle according to a first embodiment of the present invention.

FIG. 1 is a configuration diagram of a ventilation and air conditioning apparatus for a vehicle according to a first embodiment 1 of the present invention.

In FIG. 1, reference numeral 1 denotes a vehicle, 2 denotes a ventilator, 3 denotes an air conditioner, 4 denotes a duct for fresh outside air, 5 denotes a duct for conditioned air, 6 denotes a return flow duct, 7 denotes an exhaust duct, 8 denotes a bypass duct, 9a denotes a first damper, 9b denotes a second damper, and 10a denotes an air flow direction at the normal time.

The ventilator 2 sucks air inside the vehicle through the exhaust duct 7 and discharges the air outside the vehicle.

Further, the ventilator 2 sucks fresh air outside the vehicle and supplies the fresh air to the air conditioner 3 through the duct 4 for fresh outside air or supplies the fresh air inside the vehicle through the bypass duct 8 and duct 5 for conditioned air. This air flow will be described later again.

The air conditioner 3 receives return air flow inside the vehicle through the return flow duct 6 or receives supply of fresh air through the duct 4 for fresh outside air so as to perform air conditioning operation such as cooling or heating.

Further, the air conditioner 3 supplies conditioned air to inside the vehicle through the blowout port thereof and duct 5 for conditioned air.

The ventilator 2 and air conditioner 3 are arranged under the floor of the vehicle.

The duct 4 for fresh outside air connects the ventilator 2 with the air conditioner 3 so as to guide fresh air blown out from the ventilator 2 to the suction port of the air conditioner 3.

The duct 5 for conditioned air is installed throughout the upper portion of the vehicle from the blowout port of the air conditioner 3 so as to supply conditioned air blown out from the air conditioner 3 from the vehicle upper portion to the inside of the vehicle.

The return flow duct 6 connects the inside of the vehicle with the air conditioner 3 so as to return air inside the vehicle to the air conditioner 3.

The exhaust duct 7 connects the inside of the vehicle with the ventilator 2. Air inside the vehicle is sucked by the ventilator 2 through the exhaust duct 7 and discharged outside the vehicle by a function of the ventilator 2.

The bypass duct 8 connects the duct 4 for fresh outside air with the duct 5 for conditioned air. One end of the bypass duct 8 is connected to the intermediate portion between the ventilator 2 and air conditioner 3 so as to branch the duct 4 for fresh outside air, and the other end being connected to the conditioned air blowout port of the air conditioner 3.

The first damper 9a is provided at the connection between the duct 5 for conditioned air and bypass duct 8. The second damper 9b is provided at the connection between the duct 4 for fresh outside air and bypass duct 8.

The first damper 9a and second damper 9b can freely be pivoted as shown by broken lines of FIG. 1 and thus have a function of closing the duct 4 for fresh outside air, duct 5 for conditioned air, and bypass duct 8 so as to shut off the air flow in these ducts. This shut-off operation will be described concretely later.

Further, the ventilation and air conditioning apparatus for a vehicle of the first embodiment includes control means (not shown).

The control means controls the operations of the ventilator 2, air conditioner 3, first damper 9a, and second damper 9b.

The control means may be constituted by hardware like a circuit device achieving its function or may be constituted by a computation device such as a microcomputer or CPU (Central Processing Unit) and software prescribing the operation of the computation device.

In FIG. 1, the first damper 9a and second damper 9b are located at the positions denoted by solid lines. At the normal operation time of the air conditioner 3, the first damper 9a and second damper 9b are set to the positions denoted by the solid line of FIG. 1.

In the state shown in FIG. 1, the first damper 9a opens the duct 5 for conditioned air to allow the air conditioner 3 and the inside the vehicle to communicate with each other and supplies conditioned air inside the vehicle.

Further, in this state, the second damper 9b opens the duct 4 for fresh outside air to allow the ventilator 2 and air conditioner 3 to communicate with each other and supplies fresh air to the air conditioner 3.

With the arrangement of the dampers shown in FIG. 1, the air supplied inside the vehicle flows as shown by solid arrows 10a of FIG. 1.

Thus, the following air circulation can be formed. That is, the air inside the vehicle is discharged outside through the ventilator 2 and, at the same time, fresh air outside the vehicle is taken in through the ventilator 2 to be supplied inside the vehicle after being conditioned in the air conditioner 3.

In the first embodiment, "first shut-off means" corresponds to the first damper 9a.

Further, "second shut-off means" corresponds to the second damper 9b.

The configuration and normal operation of the ventilation and air conditioning apparatus for a vehicle of the first embodiment have been described.

Next, operation of the ventilation and air conditioning apparatus for a vehicle of the first embodiment at the abnormal Lime will be described.

Figure 2:
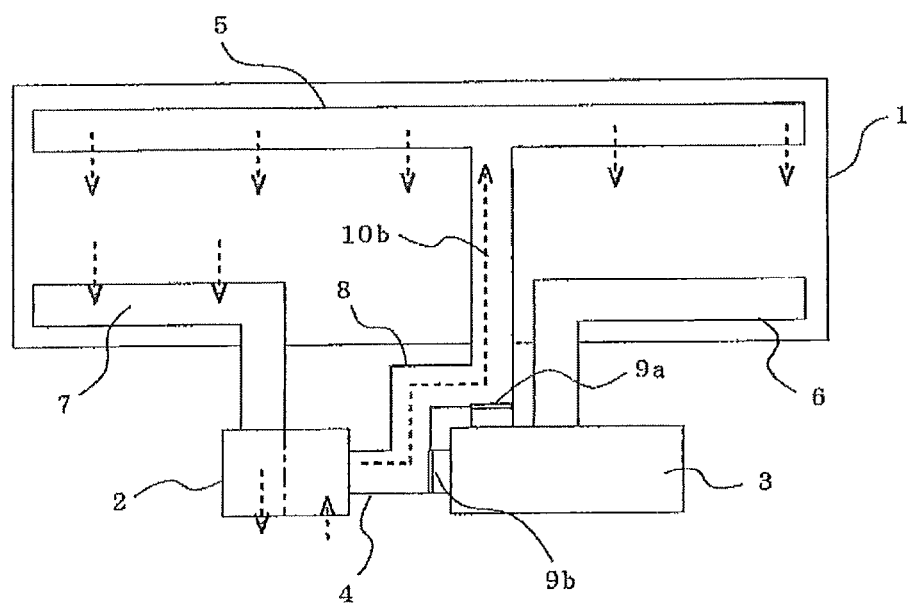
FIG. 2 is a view explaining abnormal time operation of the ventilation and air conditioning apparatus for a vehicle of the first embodiment.

FIG. 2 is a view explaining the abnormal time operation of the ventilation and air conditioning apparatus for a vehicle of the first embodiment.

The control means uses any known technique, a required sensor, or the like to detect, e.g., a leakage of refrigerant from the air conditioner 3.

Then, the control means stops the operation of the air conditioner 3 and, at the same time, moves the first damper 9a and second damper 9b to the positions shown by 9a and 9b of FIG. 2.

As a concrete method for moving the respective dampers, any technique, including issuing an electrical signal instructing release of a support member supporting each damper, may be used according to need. The members and the like required for the technique may be provided accordingly.

In the state shown in FIG. 2, the first damper 9a closes the conditioned air blowout port of the air conditioner 3 so as to prevent the refrigerant from leaking inside the vehicle and to allow the duct 5 for conditioned air and bypass duct 8 to communicate with each other.

Further, the second damper 9b closes the fresh outside air suction port of the air conditioner 3 to thereby allow the duct 4 for fresh outside air and bypass duct 8 to communicate with each other.

With the arrangement of the dampers shown in FIG. 2, the air supplied inside the vehicle flows as shown by broken arrows 10b.

That is, the conditioned air blowout port is closed so as to prevent the refrigerant of the air conditioner 3 from leaking inside the vehicle and, further, the fresh outside air sucked by the ventilator 2 can be circulated inside the vehicle.

The first damper 9a and second damper 9b are provided in the first embodiment. However, even in the case where only the first damper 9a is provided, it is possible to achieve both the functions of closing the conditioned air blowout port of the air conditioner 3 and supplying the fresh outside air inside the vehicle.

Further, in the first embodiment, the first damper 9a and second damper 9b are provided at the positions corresponding to the openings of the duct 4 for fresh outside air, duct 5 for conditioned air, and bypass duct 8 as a means for shutting off the air flow in these ducts.

However, the means for shutting, off the air flow is not limited to this.

For example, a configuration may be adopted in which diaphragm members each operating in response to an electrical instruction are provided at the positions corresponding to the openings of the respective ducts. In this case, when the air flow needs to be shut off, the diameter of the openings is made small. Further, any other shut-off means may be used.

As described above, according to the first embodiment, one end of the bypass duct 8 is connected to the duct 4 for fresh outside air and the duct 4 for fresh outside air is branched, and the other end is connected to the duct 5 for conditioned air. With this configuration, fresh outside air can be circulated inside the vehicle even if the operation of the air conditioner 3 is stopped.

Further, according to the first embodiment, the first damper 9a is provided at the conditioned air blowout port of the air conditioner 3, the air flow in the duct 5 for conditioned air can be shut off.

This prevents the refrigerant of the air conditioner 3 from leaking inside the vehicle and, even if flammable refrigerant is used, it is possible to prevent firing, thus enhancing security.

Further, according to the first embodiment, when the first damper 9a shuts off the conditioned air blowout port of the air conditioner 3, it shuts off the blowout port at a position nearer to the air conditioner 3 than the connection position between the duct 4 for fresh outside air and duct 5 for conditioned air.

This configuration allows the fresh outside air sucked by the ventilator 2 to be guided to the side nearer to the inside of the vehicle than the first damper 9a, securing a path along which the fresh outside air flows inside the vehicle, whereby it is possible to simultaneously achieve prevention of the leakage of refrigerant inside the vehicle and securing of an amount of circulation of the fresh air.

Further, the air conditioner 3 is arranged under the floor of the vehicle in the first embodiment.

As a result, even if a refrigerant leakage from the air conditioner 3 occurs, when the specific gravity of refrigerant used is greater than that of the air, it is possible to prevent the refrigerant from propagating above the air conditioner 3 in the vehicle.

Second Embodiment

As a second embodiment of the present invention, a configuration example of the air conditioner 3 will be described. The configurations of other components are the same as those in the first embodiment.

Figure 3:
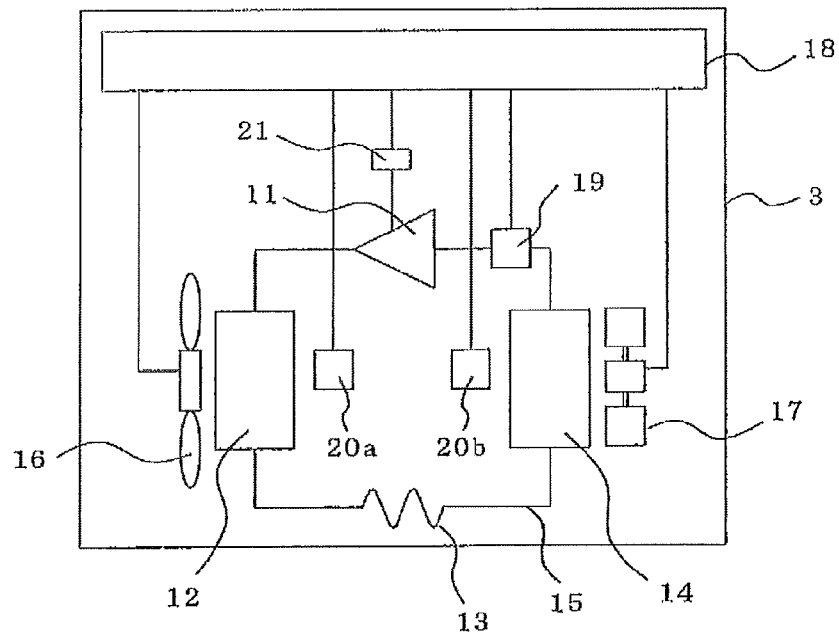
FIG. 3 is an internal configuration diagram of an air conditioner 3.

FIG. 3 is an internal configuration diagram of the air conditioner 3.

In FIG. 3, reference numeral 11 denotes a compressor, 12 denotes an outdoor heat exchanger, 13 denotes a capillary tube, 14 denotes an indoor heat exchanger, 15 denotes a refrigerant pipe, 16 denotes an outdoor blower, 17 denotes an indoor blower, 18 denotes an air conditioning controller, 19 denotes a refrigerant pressure sensor, 20a denotes an air temperature sensor provided on the upstream side of the outdoor heat exchanger, 20b denotes an air temperature sensor provided on the upstream side of the indoor heat exchanger, and 21 denotes a compressor current sensor.

The air conditioner 3 has a vapor compression refrigeration cycle constituted by the compressor 11, outdoor heat exchanger 12, capillary tube 13, indoor heat exchanger 14, and refrigerant pipe 15 which are connected in a loop. HFO-1234 (tetrafluoropropene) is encapsulated as refrigerant in the refrigeration cycle.

In general, the refrigeration cycle has characteristics such that the refrigerant pressure and compressor current varies with the temperature of the air flowing into the outdoor heat exchanger 12 and indoor heat exchanger 14, and there is a correlation between the inlet air temperature, refrigerant pressure and compressor current.

In the case where the refrigerant leaks outside the refrigeration cycle for some reasons, the refrigerant pressure and compressor current are reduced below their normal levels.

By using such characteristics of the refrigeration cycle, a refrigerant leakage can be detected.

The air conditioning controller 18 always monitors detection values of the refrigerant pressure sensor 19, air temperature sensors 20a, 20b, and compressor current sensor 21. When one of the refrigerant pressure and compressor current has been reduced below its normal value due to the temperature of the inlet air, it is determined that there has occurred a refrigerant leakage.

Note that the air conditioning controller 18 corresponds to the control means in the first embodiment.

The occurrence of the refrigerant leakage may be determined when only any one of the detection value of each sensor deviates from the characteristics at the normal operation time or may be determined by appropriately combining a plurality of detection values.

For example, a method that determines the occurrence of the refrigerant leakage when two or more detection values have exceeded their threshold values for determination thereof, a method that determines the occurrence of the refrigerant leakage when a value obtained by assigning the plurality of detection values to a predetermined arithmetic expression has exceeded its threshold value for the determination, and the like may be adopted.

The threshold serving as the criterion for the determination of the occurrence of the refrigerant leakage and correlation between the inlet air temperature and refrigerant pressure or compressor current are previously stored in a not-shown storage device such as a flash ROM (Read Only Memory), and the air conditioning controller 18 makes the determination of the refrigerant leakage by using the stored values.

When determining that the refrigerant leakage has occurred, the air conditioning controller 18 stops the compressor 11, outdoor blower 16, and indoor blower 17. At the same time, the air conditioning controller 18 moves the first damper 9a and second damper 9b so as to shut off the air conditioner 3, the duct 4 for fresh outside air, and duct 5 for conditioned air.

As a result, the refrigerant inside the air conditioner 3 does not go outside but retained therein.

On the other hand, the fresh outside air sucked by the ventilator 2 is cyclically supplied inside the vehicle, as described in the first embodiment.

In the second embodiment, an example of the configuration of the air conditioner 3, a method of detecting the refrigerant leakage, and an example of operation performed at the detection of the refrigerant leakage have been described.

Third Embodiment

Figure 4:
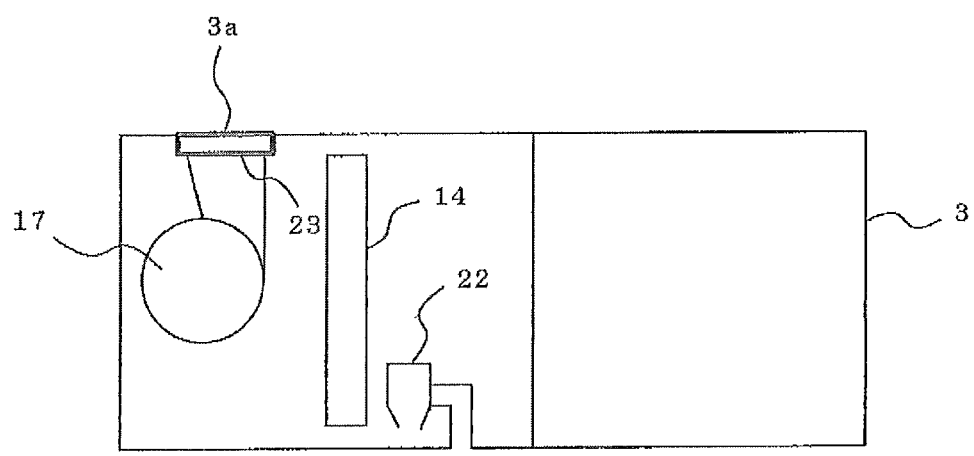
FIG. 4 is a sectional, side view of the air conditioner 3 according to a third embodiment of the present invention.

FIG. 4 is a traverse cross-sectional view of the air conditioner 3 according to a third embodiment of the present invention.

In FIG. 4, reference numeral 22 denotes a drain pump for discharging condensed water accumulated in the lower portion of the indoor heat exchanger 14 from the bottom surface of the air conditioner to the outside of the vehicle. The drain pump 22 operates according to an instruction from the air conditioning controller 18. Reference numeral 23 denotes an ultraviolet lamp provided in the vicinity (e.g., blowout port of the indoor blower 17) of a blowout port 3a of the air conditioner 3. The ultraviolet lamp is always turned ON during operation of the air conditioner 3 and, when a refrigerant leakage has occurred in the air conditioner 3, the refrigerant flowing from the air conditioner 3 into the duct 5 for conditioned air is decomposed by ultraviolet ray emitted from the ultraviolet lamp.

Other components not shown in FIG. 4 have the same configurations as those in the first and second embodiments, and the same reference numerals are given to the same parts.

"Discharge means" in the third embodiment corresponds to the drain pump 22. However, a discharge means other than the drain pump may be used.

Next, operation of the air conditioner 3 according to the third embodiment will be described.

When the air conditioner 3 performs cooling operation, moisture in the air is condensed by the indoor heat exchanger 14 and accumulated in the lower portion of the indoor heat exchanger 14. Then, the drain pump 22 is activated to discharge the accumulated moisture outside the vehicle.

In general, the drain pump 22 operates only during the cooling operation. While the cooling operation is not performed, the condensed water does not occur, so that the drain pump 22 is stopped.

At the time when the refrigerant leakage occurs, the air conditioning controller 18 performs the operation described in the first and second embodiments while driving the drain pump 22.

The refrigerant has a specific gravity greater than that of the air, so that it is retained in the lower part of the air conditioner 3 at the time of occurrence of the refrigerant leakage. At this time, however, the drain pump 22 is being driven, so that the refrigerant is discharged outside the vehicle. The refrigerant discharged outside the vehicle is decomposed by ultraviolet ray.

When a refrigerant leakage has occurred in the air conditioner, the refrigerant passes through the indoor blower 17 and reaches the duct 5 for conditioned air before detection of the refrigerant leakage. However, the ultraviolet lamp provided in the vicinity of the blowout port 3a is always turned ON during operation of the air conditioner, so that the leaking refrigerant is decomposed by ultraviolet ray emitted from the ultraviolet lamp.

As described above, according to the third embodiment, when the refrigerant leakage has occurred, the compressor 11, outdoor blower 16, and indoor blower 17 are stopped but the drain pump 22 continues being driven to discharge the refrigerant outside the vehicle.

Further, the refrigerant that passes through the indoor blower 17 and reaches the duct 5 for conditioned air between the time when the refrigerant leakage is detected and time when the indoor blower 17 is stopped is decomposed by ultraviolet ray emitted from the ultraviolet lamp provided in the vicinity of the blowout port 3a.

As described above, by combining the operations of the ultraviolet lamp 23, first damper 9a, and drain pump 22, it is possible to prevent the leakage of refrigerant from flowing inside the vehicle more reliably.

As a result, welding of a refrigerant pipe required to be performed inside the air conditioner 3 for repair can be conducted safely.

Fourth Embodiment

Although HFO-1234 is used as the refrigerant in the above first to third embodiments, other suitable refrigerant may be used.

Even in the case where other flammable refrigerant is used, it is possible to prevent firing and the like by shutting off the flow of the conditioned air at the time of occurrence of the refrigerant leakage and to endure sufficient circulation of fresh air.

REFERENCE SIGNS LIST

1: Vehicle
2: Ventilator
3: Air conditioner
3a: Blowout port of air conditioner
4: Duct for fresh outside air
5: Duct for conditioned air
6: Return flow duct
7: Exhaust duct
8: Bypass duct
9a: First damper
9b: Second damper
10a, 10b: Air flow
11: Compressor
12: Outdoor heat exchanger
13: Capillary tube
14: Indoor heat exchanger
15: Refrigerant pipe
16: Outdoor blower
17: Indoor blower
18: Air conditioning controller
19: Refrigerant pressure sensor 20a, 20b: Air temperature sensor
21: Compressor current sensor
22: Drain pump
23: Ultraviolet lamp

The invention claimed is:

1. A ventilation and air conditioning apparatus for a vehicle comprising:
   a ventilator that sucks air from outside the vehicle;
   an air conditioner, in which a refrigerant is enclosed, that conditions air inside the vehicle;
   a duct for fresh outside air that connects the ventilator with the air conditioner so as to supply the air that the ventilator sucked from outside the vehicle to the air conditioner;
   a duct for conditioned air that supplies the conditioned air blown out from the air conditioner to inside the vehicle and to which the duct for fresh outside air branched in a midway is connected:
   a first shutter for shutting off a blowout port of the air conditioner so as to prevent the conditioned air blown out from the air conditioner from being supplied inside the vehicle and for opening a connection port between the duct for fresh outside air and the duct for conditioned air:
   a pump that discharges leaked refrigerant from a lower portion of the air conditioner to outside of the vehicle when refrigerant leakage occurs; and
   a second shutter that prevents the air that the ventilator has sucked from outside the vehicle from being supplied to the air conditioner, wherein the second shutter is arranged downstream of the ventilator and upstream of the air conditioner, the connection port and the first shutter, in an air circulation direction.

2. The ventilation and air conditioning apparatus for a vehicle of claim 1, wherein
the pump is a drain pump that is used for discharging condensed water accumulated in the lower portion of the indoor heat exchanger provided by the air conditioner to outside of the vehicle.

3. The ventilation and air conditioning apparatus for a vehicle of claim 1, wherein at the blowout port an ultraviolet lamp is provided that decomposes the refrigerant flowing out from the blowout port to the duct for conditioned air by ultraviolet radiation.

4. The ventilation and air conditioning apparatus for a vehicle of claim 1, wherein, air that the ventilator has sucked from outside the vehicle is guided through the connection port at a side nearer to the inside of the vehicle than the first shutter.

5. The ventilation and air conditioning apparatus for a vehicle of claim 2, wherein
the first shutter shuts off the blowout port at a position nearer to the air conditioner than a connection position between the duct for fresh outside air and the duct for conditioned air so that a path along which the air that the ventilator has sucked from outside the vehicle flows into the vehicle through the branched duct of the duct for fresh outside air is secured.

6. The ventilation and air conditioning apparatus for a vehicle of claim 2, comprising:
a sensor that detects a refrigerant leakage in the air conditioner; and
a controller that controls operations of the air conditioner and the first shutter, wherein,
when determining an occurrence of the refrigerant leakage of the air conditioner based on a detection value of the sensor, the controller stops the operation of the air conditioner and operates the first shutter so as to prevent the conditioned air blown out from the air conditioner from being supplied inside the vehicle.

7. The ventilation and air conditioning apparatus for a vehicle of claim 1, wherein
the air conditioner is arranged under the floor of the vehicle.

8. The ventilation and air conditioning apparatus for a vehicle of claim 1, wherein
the air conditioner uses HFO-1234 as the refrigerant.

9. The ventilation and air conditioning apparatus for a vehicle of claim 3, wherein
the first shutter shuts off the blowout port at a position nearer to the air conditioner than a connection position between the duct for fresh outside air and the duct for conditioned air so that a path along which the air that the ventilator has sucked from outside the vehicle flows into the vehicle through the branched duct of the duct for fresh outside air is secured.

10. The ventilation and air conditioning apparatus for a vehicle of claim 4, wherein
the first shutter shuts off the blowout port at a position nearer to the air conditioner than a connection position between the duct for fresh outside air and the duct for conditioned air so that a path along which the air that the ventilator has sucked from outside the vehicle flows into the vehicle through the branched duct of the duct for fresh outside air is secured.

11. The ventilation and air conditioning apparatus for a vehicle of claim 3, comprising:
a sensor that detects a refrigerant leakage in the air conditioner; and
a controller that controls operations of the air conditioner and the first shutter, wherein,
when determining an occurrence of the refrigerant leakage of the air conditioner based on a detection value of the sensor, the controller stops the operation of the air conditioner and operates the first shutter so as to prevent the conditioned air blown out from the air conditioner from being supplied inside the vehicle.

12. The ventilation and air conditioning apparatus for a vehicle of claim 4, comprising:
a sensor that detects a refrigerant leakage in the air conditioner; and
a controller that controls operations of the air conditioner and the first shutter, wherein,
when determining an occurrence of the refrigerant leakage of the air conditioner based on a detection value of the sensor, the controller stops the operation of the air conditioner and operates the first shutter so as to prevent the conditioned air blown out from the air conditioner from being supplied inside the vehicle.

13. The ventilation and air conditioning apparatus for a vehicle of claim 5, comprising:
a sensor that detects a refrigerant leakage in the air conditioner; and
a controller that controls operations of the air conditioner and the first shutter, wherein,
when determining an occurrence of the refrigerant leakage of the air conditioner based on a detection value of the sensor, the controller stops the operation of the air conditioner and operates the first shutter so as to prevent the conditioned air blown out from the air conditioner from being supplied inside the vehicle.

14. The ventilation and air conditioning apparatus for a vehicle of claim 2, wherein
at the blowout port an ultraviolet lamp is provided that decomposes the refrigerant flowing out from the blowout port to the duct for conditioned air by ultraviolet radiation.

15. The ventilation and air conditioning apparatus for a vehicle of claim 1, wherein
the air conditioner uses a flammable refrigerant as the refrigerant.

* * * * *